(12) United States Patent
Aziz

(10) Patent No.: US 8,635,696 B1
(45) Date of Patent: Jan. 21, 2014

(54) SYSTEM AND METHOD OF DETECTING TIME-DELAYED MALICIOUS TRAFFIC

(71) Applicant: FireEye, Inc., Milpitas, CA (US)

(72) Inventor: Ashar Aziz, Fremont, CA (US)

(73) Assignee: FireEye, Inc., Milpitas, CA (US)

(*) Notice: Subject to any disclaimer, the term of this patent is extended or adjusted under 35 U.S.C. 154(b) by 0 days.

(21) Appl. No.: 13/931,631

(22) Filed: Jun. 28, 2013

Related U.S. Application Data

(63) Continuation of application No. 11/096,287, filed on Mar. 31, 2005, now Pat. No. 8,528,086.

(60) Provisional application No. 60/559,198, filed on Apr. 1, 2004.

(51) Int. Cl.
*G06F 21/00* (2013.01)

(52) U.S. Cl.
USPC ............... 726/23; 726/26; 713/176; 713/193

(58) Field of Classification Search
None
See application file for complete search history.

(56) References Cited

U.S. PATENT DOCUMENTS

| | | | |
|---|---|---|---|
| 4,292,580 A | 9/1981 | Ott et al. | |
| 5,175,732 A | 12/1992 | Hendel et al. | |
| 5,440,723 A | 8/1995 | Arnold et al. | |
| 5,657,473 A | 8/1997 | Killean et al. | |
| 5,978,917 A | 11/1999 | Chi | |
| 6,269,330 B1 | 7/2001 | Cidon et al. | |
| 6,298,445 B1 | 10/2001 | Shostack et al. | |
| 6,357,008 B1 | 3/2002 | Nachenberg | |
| 6,424,627 B1 | 7/2002 | Sorhaug et al. | |
| 6,487,666 B1 | 11/2002 | Shanklin et al. | |
| 6,493,756 B1 | 12/2002 | O'Brien et al. | |
| 6,550,012 B1 | 4/2003 | Villa et al. | |
| 6,775,657 B1 | 8/2004 | Baker | |
| 6,832,367 B1 | 12/2004 | Choi et al. | |

(Continued)

FOREIGN PATENT DOCUMENTS

| | | |
|---|---|---|
| GB | 2439806 | 1/2008 |
| WO | WO-02/06928 | 1/2002 |
| WO | WO-02/23805 | 3/2002 |

OTHER PUBLICATIONS

International Search Report and Written Opinion mailed May 10, 2012 in Application No. PCT/US12/21916.

(Continued)

*Primary Examiner* — Philip Chea
*Assistant Examiner* — Kendall Dolly
(74) *Attorney, Agent, or Firm* — Blakely, Sokoloff, Taylor & Zafman LLP

(57) ABSTRACT

A system for detecting a computer worm comprises a traffic analysis device in communication with a network device. The traffic analysis device can analyze network traffic received over a communication network and duplicate at least select network communications within the network traffic having characteristics associated with one or more computer worms. The network device comprises a controller in communication with one or more virtual machines that are configured to receive the duplicated network communications from the traffic analysis device. The network device may (i) monitor a behavior of a first virtual machine of the one or more virtual machines in response to processing of the duplicated network communications within the first virtual machine, (ii) identify an anomalous behavior as an unexpected occurrence in the monitored behavior, and (iii) determine, based on the identified anomalous behavior, the presence of the one or more computer worms in the duplicated network communications.

42 Claims, 4 Drawing Sheets

(56) References Cited

U.S. PATENT DOCUMENTS

| | | | |
|---|---|---|---|
| 6,895,550 B2 | 5/2005 | Kanchirayappa et al. | |
| 6,898,632 B2 | 5/2005 | Gordy et al. | |
| 6,981,279 B1* | 12/2005 | Arnold et al. | 726/22 |
| 7,007,107 B1 | 2/2006 | Ivchenko et al. | |
| 7,043,757 B2 | 5/2006 | Hoefelmeyer et al. | |
| 7,069,316 B1 | 6/2006 | Gryaznov | |
| 7,080,408 B1 | 7/2006 | Pak et al. | |
| 7,093,239 B1 | 8/2006 | van der Made | |
| 7,100,201 B2 | 8/2006 | Izatt | |
| 7,159,149 B2 | 1/2007 | Spiegel et al. | |
| 7,231,667 B2 | 6/2007 | Jordan | |
| 7,240,364 B1 | 7/2007 | Branscomb et al. | |
| 7,240,368 B1 | 7/2007 | Roesch et al. | |
| 7,287,278 B2 | 10/2007 | Liang | |
| 7,308,716 B2 | 12/2007 | Danford et al. | |
| 7,356,736 B2 | 4/2008 | Natvig | |
| 7,386,888 B2* | 6/2008 | Liang et al. | 726/23 |
| 7,392,542 B2 | 6/2008 | Bucher | |
| 7,418,729 B2 | 8/2008 | Szor | |
| 7,428,300 B1 | 9/2008 | Drew et al. | |
| 7,441,272 B2 | 10/2008 | Durham et al. | |
| 7,448,084 B1 | 11/2008 | Apap et al. | |
| 7,458,098 B2 | 11/2008 | Judge et al. | |
| 7,464,404 B2 | 12/2008 | Carpenter et al. | |
| 7,464,407 B2 | 12/2008 | Nakae et al. | |
| 7,480,773 B1 | 1/2009 | Reed | |
| 7,487,543 B2 | 2/2009 | Arnold et al. | |
| 7,496,960 B1 | 2/2009 | Chen et al. | |
| 7,496,961 B2 | 2/2009 | Zimmer et al. | |
| 7,519,990 B1* | 4/2009 | Xie | 726/13 |
| 7,523,493 B2 | 4/2009 | Liang et al. | |
| 7,530,104 B1 | 5/2009 | Thrower et al. | |
| 7,540,025 B2 | 5/2009 | Tzadikario | |
| 7,565,550 B2 | 7/2009 | Liang et al. | |
| 7,603,715 B2 | 10/2009 | Costa et al. | |
| 7,639,714 B2 | 12/2009 | Stolfo et al. | |
| 7,644,441 B2 | 1/2010 | Schmid et al. | |
| 7,676,841 B2 | 3/2010 | Sobchuk et al. | |
| 7,698,548 B2 | 4/2010 | Shelest et al. | |
| 7,707,633 B2 | 4/2010 | Danford et al. | |
| 7,779,463 B2 | 8/2010 | Stolfo et al. | |
| 7,784,097 B1 | 8/2010 | Stolfo et al. | |
| 7,849,506 B1 | 12/2010 | Dansey et al. | |
| 7,904,959 B2 | 3/2011 | Sidiroglou et al. | |
| 7,908,660 B2 | 3/2011 | Bahl | |
| 7,937,761 B1* | 5/2011 | Bennett | 726/23 |
| 7,996,556 B2 | 8/2011 | Raghavan et al. | |
| 7,996,905 B2 | 8/2011 | Arnold et al. | |
| 8,006,305 B2 | 8/2011 | Aziz | |
| 8,028,338 B1 | 9/2011 | Schneider et al. | |
| 8,069,484 B2 | 11/2011 | McMillan et al. | |
| 8,087,086 B1 | 12/2011 | Lai et al. | |
| 8,171,553 B2 | 5/2012 | Aziz et al. | |
| 8,375,444 B2 | 2/2013 | Aziz et al. | |
| 2001/0047326 A1 | 11/2001 | Broadbent et al. | |
| 2002/0018903 A1 | 2/2002 | Kokubo et al. | |
| 2002/0038430 A1 | 3/2002 | Edwards et al. | |
| 2002/0091819 A1 | 7/2002 | Melchione et al. | |
| 2002/0144156 A1 | 10/2002 | Copeland, III | |
| 2002/0162015 A1 | 10/2002 | Tang | |
| 2002/0184528 A1 | 12/2002 | Shevenell et al. | |
| 2002/0188887 A1 | 12/2002 | Largman et al. | |
| 2002/0194490 A1 | 12/2002 | Halperin et al. | |
| 2003/0074578 A1 | 4/2003 | Ford et al. | |
| 2003/0084318 A1 | 5/2003 | Schertz | |
| 2003/0115483 A1 | 6/2003 | Liang | |
| 2003/0188190 A1 | 10/2003 | Aaron et al. | |
| 2003/0200460 A1 | 10/2003 | Morota et al. | |
| 2004/0019832 A1 | 1/2004 | Arnold et al. | |
| 2004/0047356 A1 | 3/2004 | Bauer | |
| 2004/0083408 A1 | 4/2004 | Spiegel et al. | |
| 2004/0111531 A1 | 6/2004 | Staniford et al. | |
| 2004/0165588 A1 | 8/2004 | Pandya | |
| 2004/0236963 A1 | 11/2004 | Danford et al. | |
| 2004/0243349 A1 | 12/2004 | Greifeneder et al. | |
| 2004/0249911 A1 | 12/2004 | Alkhatib et al. | |
| 2004/0268147 A1 | 12/2004 | Wiederin et al. | |
| 2005/0033960 A1 | 2/2005 | Vialen et al. | |
| 2005/0033989 A1 | 2/2005 | Poletto et al. | |
| 2005/0086523 A1 | 4/2005 | Zimmer et al. | |
| 2005/0091513 A1 | 4/2005 | Mitomo et al. | |
| 2005/0091533 A1 | 4/2005 | Omote et al. | |
| 2005/0114663 A1 | 5/2005 | Cornell et al. | |
| 2005/0125195 A1 | 6/2005 | Brendel | |
| 2005/0157662 A1 | 7/2005 | Bingham et al. | |
| 2005/0183143 A1 | 8/2005 | Anderholm et al. | |
| 2005/0201297 A1 | 9/2005 | Peikari | |
| 2005/0210533 A1 | 9/2005 | Copeland et al. | |
| 2005/0238005 A1 | 10/2005 | Chen et al. | |
| 2005/0265331 A1 | 12/2005 | Stolfo | |
| 2006/0015715 A1 | 1/2006 | Anderson | |
| 2006/0021054 A1 | 1/2006 | Costa et al. | |
| 2006/0075496 A1 | 4/2006 | Carpenter et al. | |
| 2006/0095968 A1 | 5/2006 | Portolani et al. | |
| 2006/0101516 A1 | 5/2006 | Sudaharan et al. | |
| 2006/0101517 A1 | 5/2006 | Banzhof et al. | |
| 2006/0117385 A1 | 6/2006 | Mester et al. | |
| 2006/0123477 A1 | 6/2006 | Raghavan et al. | |
| 2006/0143709 A1 | 6/2006 | Brooks et al. | |
| 2006/0161983 A1 | 7/2006 | Cothrell et al. | |
| 2006/0161987 A1 | 7/2006 | Levy-Yurista | |
| 2006/0164199 A1 | 7/2006 | Gilde et al. | |
| 2006/0173992 A1 | 8/2006 | Weber et al. | |
| 2006/0184632 A1 | 8/2006 | Marino et al. | |
| 2006/0191010 A1 | 8/2006 | Benjamin | |
| 2006/0221956 A1 | 10/2006 | Narayan et al. | |
| 2006/0288417 A1 | 12/2006 | Bookbinder et al. | |
| 2007/0006288 A1 | 1/2007 | Mayfield et al. | |
| 2007/0006313 A1 | 1/2007 | Porras et al. | |
| 2007/0016951 A1 | 1/2007 | Piccard et al. | |
| 2007/0033645 A1 | 2/2007 | Jones | |
| 2007/0038943 A1 | 2/2007 | FitzGerald et al. | |
| 2007/0064689 A1 | 3/2007 | Shin et al. | |
| 2007/0094730 A1 | 4/2007 | Bhikkaji et al. | |
| 2007/0174915 A1* | 7/2007 | Gribble et al. | 726/24 |
| 2007/0192500 A1 | 8/2007 | Lum | |
| 2007/0192858 A1 | 8/2007 | Lum | |
| 2007/0198275 A1 | 8/2007 | Malden et al. | |
| 2007/0250930 A1 | 10/2007 | Aziz et al. | |
| 2007/0271446 A1 | 11/2007 | Nakamura | |
| 2008/0005782 A1 | 1/2008 | Aziz | |
| 2008/0072326 A1 | 3/2008 | Danford et al. | |
| 2008/0080518 A1 | 4/2008 | Hoeflin et al. | |
| 2008/0120722 A1 | 5/2008 | Sima et al. | |
| 2008/0141376 A1 | 6/2008 | Clausen et al. | |
| 2008/0222729 A1 | 9/2008 | Chen et al. | |
| 2008/0263665 A1 | 10/2008 | Ma et al. | |
| 2008/0295172 A1 | 11/2008 | Bohacek | |
| 2008/0301810 A1 | 12/2008 | Lehane et al. | |
| 2009/0031423 A1 | 1/2009 | Liu et al. | |
| 2009/0083369 A1 | 3/2009 | Marmor | |
| 2009/0083855 A1 | 3/2009 | Apap et al. | |
| 2009/0089879 A1 | 4/2009 | Wang et al. | |
| 2009/0094697 A1 | 4/2009 | Provos et al. | |
| 2009/0271867 A1 | 10/2009 | Zhang | |
| 2009/0300761 A1 | 12/2009 | Park et al. | |
| 2009/0328221 A1 | 12/2009 | Blumfield et al. | |
| 2010/0054278 A1 | 3/2010 | Stolfo et al. | |
| 2010/0077481 A1 | 3/2010 | Polyakov et al. | |
| 2010/0083376 A1 | 4/2010 | Pereira et al. | |
| 2010/0115621 A1 | 5/2010 | Staniford et al. | |
| 2010/0192223 A1 | 7/2010 | Ismael et al. | |
| 2010/0251104 A1 | 9/2010 | Massand | |
| 2010/0281102 A1 | 11/2010 | Chinta et al. | |
| 2010/0281541 A1 | 11/2010 | Stolfo et al. | |
| 2010/0281542 A1 | 11/2010 | Stolfo et al. | |
| 2010/0287260 A1 | 11/2010 | Peterson et al. | |
| 2011/0047620 A1 | 2/2011 | Mahaffey et al. | |
| 2011/0093951 A1 | 4/2011 | Aziz | |
| 2011/0099633 A1 | 4/2011 | Aziz | |
| 2011/0247072 A1 | 10/2011 | Staniford et al. | |
| 2011/0307955 A1 | 12/2011 | Kaplan et al. | |
| 2011/0314546 A1 | 12/2011 | Aziz et al. | |
| 2012/0079596 A1 | 3/2012 | Thomas et al. | |

(56) References Cited

U.S. PATENT DOCUMENTS

| | | |
|---|---|---|
| 2012/0084859 A1 | 4/2012 | Radinsky et al. |
| 2012/0174186 A1 | 7/2012 | Aziz et al. |
| 2012/0174218 A1 | 7/2012 | McCoy et al. |

OTHER PUBLICATIONS

International Search Report and Written Opinion mailed May 25, 2012 in Application No. PCT/US12/26402.
*IEEE Xplore Digital Library Sear Results for "detection of unknown computer worms"*. Http//ieeexplore.ieee.org/searchresult.jsp?SortField=Score&SortOrder=desc&ResultC . . . , (Accessed on Aug. 28, 2009).
*AltaVista Advanced Search Results. "Event Orchestrator"*. Http://www.altavista.com/web/results?Itag=ody&pg=aq&aqmode=aqa=Event+Orchesrator . . . , (Accessed on Sep. 3, 2009).
*AltaVista Advanced Search Results. "attack vector identifier"*. Http://www.altavista.com/web/results?Itag=ody&pg=aq&aqmode=aqa=Event+Orchestrator . . . , (Accessed on Sep. 15, 2009).
"Packet", *Microsoft Computer Dictionary, Microsoft Press*, (Mar. 2002), 1 page.
Chaudet, C. , et al., "Optimal Positioning of Active and Passive Monitoring Devices", *International Conference on Emerging Networking Experiments and Technologies, Proceedings of the 2005 ACM Conference on Emerging Network Experiment and Technology*, CoNEXT '05, Toulousse, France, (Oct. 2005), pp. 71-82.
Costa, M. , et al., "Vigilante: End-to-End Containment of Internet Worms", *SOSP '05, Association for Computing Machinery, Inc.*, Brighton U.K., (Oct. 23-26, 2005).
Crandall, J.R. , et al., "Minos:Control Data Attack Prevention Orthogonal to Memory Model", *37th International Symposium on Microarchitecture*, Portland, Oregon, (Dec. 2004).
Kim, H. , et al., "Autograph: Toward Automated, Distributed Worm Signature Detection", *Proceedings of the 13th Usenix Security Symposium (Security 2004)*, San Diego, (Aug. 2004), pp. 271-286.
Kreibich, C., et al., "Honeycomb-Creating Intrusion Detection Signatures Using Honeypots", *2nd Workshop on Hot Topics in Networks (HotNets-11)*, Boston, USA, (2003).
Kristoff, J., "Botnets, Detection and Mitigation: DNS-Based Techniques", *NU Security Day*, (2005), 23 pages.
Margolis, P.E. , "Random House Webster's 'Computer & Internet Dictionary 3rd Edition'", ISBN 0375703519, (Dec. 1998).
Moore, D. , et al., "Internet Quarantine: Requirements for Containing Self-Propagating Code", *INFOCOM*, vol. 3, (Mar. 30-Apr. 3, 2003), pp. 1901-1910.
Newsome, J. , et al., "Dynamic Taint Analysis for Automatic Detection, Analysis, and Signature Generation of Exploits on Commodity Software", *In Proceedings of the 12th Annual Network and Distributed System Security, Symposium (NDSS '05)*, (Feb. 2005).
Newsome, J. , et al., "Polygraph: Automatically Generating Signatures for Polymorphic Worms", *In Proceedings of the IEEE Symposium on Security and Privacy*, (May 2005).
Nojiri, D. , et al., "Cooperation Response Strategies for Large Scale Attack Mitigation", *DARPA Information Survivability Conference and Exposition*, vol. 1, (Apr. 22-24, 2003), pp. 293-302.
Silicon Defense, "Worm Containment in the Internal Network", (Mar. 2003), pp. 1-25.
Singh, S. , et al., "Automated Worm Fingerprinting", *Proceedings of the ACM/USENIX Symposium on Operating System Design and Implementation*, San Francisco, California, (Dec. 2004).
Whyte, et al., "DNS-Based Detection of Scanning Works in an Enterprise Network", *Proceedings of the 12th Annual Network and Distributed System Security Symposium*, (Feb. 2005), 15 pages.
Williamson, Matthew M., "Throttling Viruses: Restricting Propagation to Defeat Malicious Mobile Code", *ACSAC Conference*, Las Vegas, NV, USA, (Dec. 2002), pp. 1-9.
U.S. Appl. No. 14/012,945, Non-Final Office Action, mailed Nov. 6, 2013.

\* cited by examiner

SYSTEM AND METHOD OF DETECTING TIME-DELAYED MALICIOUS TRAFFIC

CROSS-REFERENCE TO RELATED APPLICATIONS

This application is a continuation of U.S. patent application Ser. No. 11/096,287, now U.S. Pat. No. 8,528,086, which claims the benefit of U.S. provision patent application No. 60/559,198, filed Apr. 1, 2004 and entitled "System and Method of Detecting Computer Worms," the entire contents of both of which are incorporated by reference herein.

BACKGROUND

1. Field of the Invention

The present invention relates generally to computing systems, and more particularly to systems and methods of detecting computer worms in computer networks.

2. Background Art

Detecting and distinguishing computer worms from ordinary communications traffic within a computer network is a challenging problem. Moreover, modern computer worms operate at an ever increasing level of sophistication and complexity. Consequently, it has become increasingly difficult to detect computer worms.

A computer worm can propagate through a computer network by using active propagation techniques. One active propagation technique of a computer worm is to select target systems to infect by scanning a network address space of a computer network (e.g., a scan directed computer worm). Another active propagation technique of a computer worm is to use topological information from an infected system in a computer network to actively propagate the computer worm in the computer network (e.g., a topologically directed computer worm). Still another active propagation technique of a computer worm is to select target systems to infect based on a previously generated list of target systems (e.g., a hit-list directed computer worm).

In addition to active propagation techniques, a computer worm may propagate through a computer network by using passive propagation techniques. One passive propagation technique of a computer worm is to attach itself to normal network communications not initiated by the computer worm itself (e.g., a stealthy or passive contagion computer worm). The computer worm then propagates through the computer network in the context of normal communication patterns not directed by the computer worm.

It is anticipated that next-generation computer worms will have multiple transport vectors, use multiple target selection techniques, have no previously known signatures, and will target previously unknown vulnerabilities. It is also anticipated that next generation computer worms will use a combination of active and passive propagation techniques and may emit chaff traffic (i.e., spurious traffic generated by the computer worm) to cloak the communication traffic that carries the actual exploit sequences of the computer worms. This chaff traffic will be emitted in order to confuse computer worm detection systems and to potentially trigger a broad denial-of-service by an automated response system.

Approaches for detecting computer worms in a computer system include misuse detection and anomaly detection. In misuse detection, known attack patterns of computer worms are used to detect the presence of the computer worm. Misuse detection works reliably for known attack patterns but is not particularly useful for detecting novel attacks. In contrast to misuse detection, anomaly detection has the ability to detect novel attacks. In anomaly detection, a baseline of normal behavior in a computer network is created so that deviations from this behavior can be flagged as an anomaly. The difficulty inherent in this approach is that universal definitions of normal behavior are difficult to obtain. Given this limitation, anomaly detection approaches strive to minimize false positive rates of computer worm detection.

In one suggested computer worm containment system, detection devices are deployed in a computer network to monitor outbound network traffic and detect active scan directed computer worms in the computer network. To achieve effective containment of these active computer worms (as measured by the total infection rate over the entire population of systems), the detection devices are widely deployed in the computer network in an attempt to detect computer worm traffic close to a source of the computer worm traffic. Once detected, these computer worms are contained by using an address blacklisting technique. This computer worm containment system, however, does not have a mechanism for repair and recovery of infected computer networks.

In another suggested computer worm containment system, the protocols (e.g., network protocols) of network packets are checked for standards compliance under an assumption that a computer worm will violate the protocol standards (e.g., exploit the protocol standards) in order to successfully infect a computer network. While this approach may be successful in some circumstances, this approach is limited in other circumstances. Firstly, it is possible for a network packet to be fully compatible with published protocol standard specifications and still trigger a buffer overflow type of software error due to the presence of a software bug. Secondly, not all protocols of interest can be checked for standards compliance because proprietary or undocumented protocols may be used in a computer network. Moreover, evolutions of existing protocols and the introduction of new protocols may lead to high false positive rates of computer worm detection when "good" behavior cannot be properly and completely distinguished from "bad" behavior. Encrypted communications channels further complicate protocol checking because protocol compliance cannot be easily validated at the network level for encrypted traffic.

In another approach to computer worm containment, "honey farms" have been proposed. A honey farm includes "honeypots" that are sensitive to probe attempts in a computer network. One problem with this approach is that probe attempts do not necessarily indicate the presence of a computer worm because there may be legitimate reasons for probing a computer network. For example, a computer network can be legitimately probed by scanning an Internet Protocol (IP) address range to identify poorly configured or rogue devices in the computer network. Another problem with this approach is that a conventional honey farm does not detect passive computer worms and does not extract signatures or transport vectors in the face of chaff emitting computer worms.

Another approach to computer worm containment assumes that computer worm probes are identifiable at a given worm sensor in a computer network because the computer worm probes will target well known vulnerabilities and thus have well known signatures which can be detected using a signature-based intrusion detection system. Although this approach may work for well known computer worms that periodically recur, such as the CodeRed computer worm, this approach does not work for novel computer worm attacks exploiting a zero-day vulnerability (e.g., a vulnerability that is not widely known).

One suggested computer worm containment system attempts to detect computer worms by observing communication patterns between computer systems in a computer network. In this system, connection histories between computer systems are analyzed to discover patterns that may represent a propagation trail of the computer worm. In addition to false positive related problems, the computer worm containment system does not distinguish between the actual transport vector of a computer worm and a transport vector including a spuriously emitted chaff trail. As a result, simply examining malicious traffic to determine the transport vector can lead to a broad denial of service (DOS) attack on the computer network. Further, the computer worm containment system does not determine a signature of the computer worm that can be used to implement content filtering of the computer worm. In addition, the computer worm containment system does not have the ability to detect stealthy passive computer worms, which by their very nature cause no anomalous communication patterns.

In light of the above, there exists a need for an effective system and method of detecting computer worms.

SUMMARY OF THE INVENTION

A computer worm detection system addresses the need for detecting computer worms. In accordance with various embodiments, a computer worm sensor is coupled to a communication network. The computer worm sensor allows a computer worm to propagate from the communication network to a computer network in the computer worm sensor. The computer worm sensor orchestrates network activities in the computer network, monitors the behavior of the computer network, and identifies an anomalous behavior in the monitored behavior to detect a computer worm. Additionally, the computer worm detection system determines an identifier for detecting the computer worm based on the anomalous behavior.

A system in accordance with one embodiment includes a computer network and a controller in communication with the computer network. The controller is configured to orchestrate a predetermined sequence of network activities in the computer network, monitor a behavior of the computer network in response to the predetermined sequence of network activities, and identify an anomalous behavior in the monitored behavior to detect the computer worm.

A method in accordance with one embodiment includes orchestrating a predetermined sequence of network activities in a computer network and monitoring a behavior of the computer network in response to the predetermined sequence of network activities. Further, the method comprises identifying an anomalous behavior in the monitored behavior to detect the computer worm.

DETAILED DESCRIPTION

A computer worm detection system in accordance with one embodiment of the present invention orchestrates network activities in a computer network and monitors the behavior of the computer network. The computer worm detection system detects a computer worm in the computer network based on the monitored behavior of the computer network. Additionally, the computer worm detection system determines an identifier, such as a signature or a vector, for detecting the computer worm. The computer worm detection system can generate a recovery script to disable the computer worm and repair damage caused by the computer worm.

Figure 1:
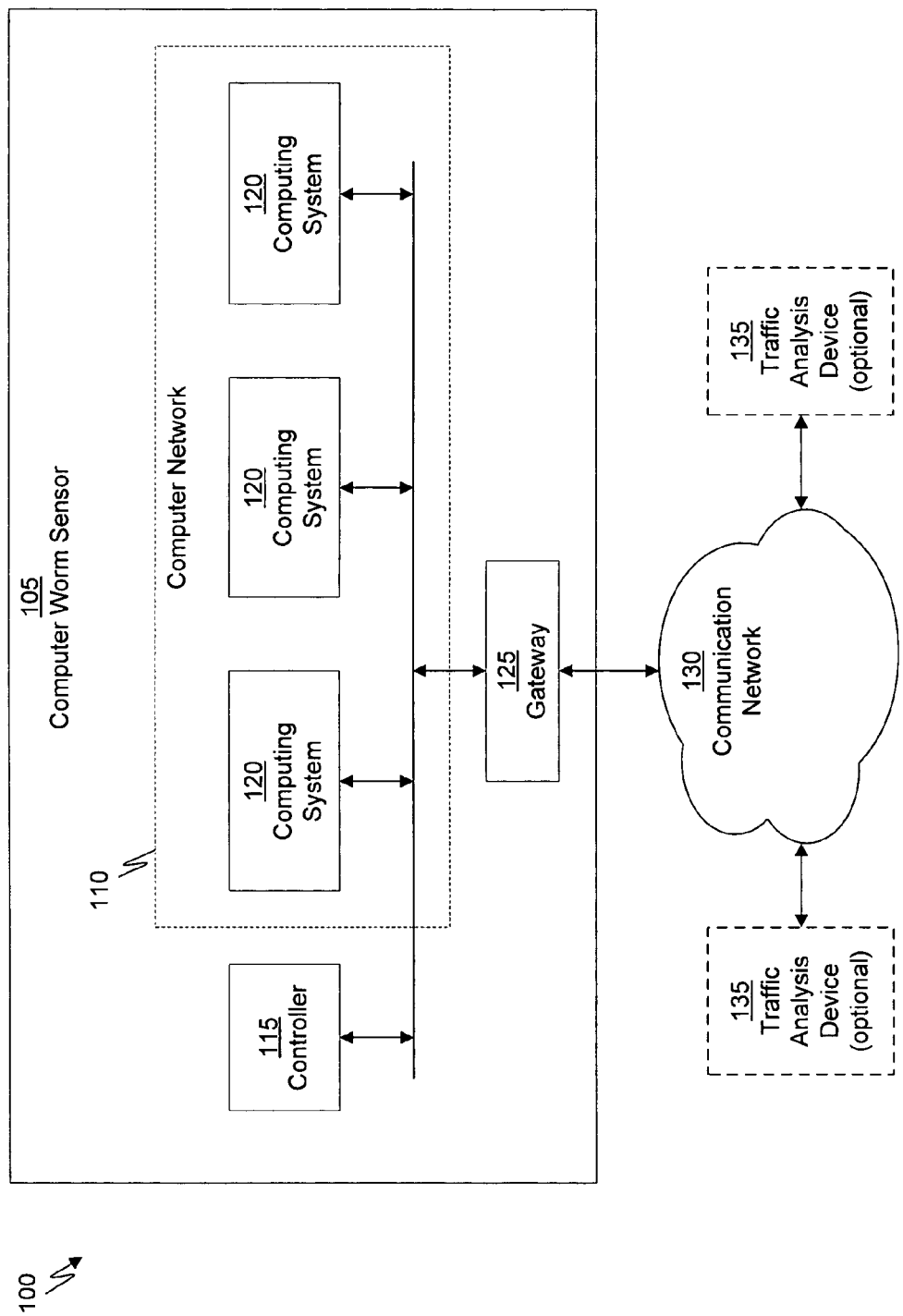
FIG. 1 depicts a computing environment in which a worm sensor can be implemented, in accordance with one embodiment of the present invention.

FIG. 1 depicts an exemplary computing environment 100 in which a computer worm sensor 105 can be implemented, in accordance with one embodiment of the present invention. In various embodiments, the computer worm sensor 105 functions as a computer worm detection system, as is described more fully herein. The computer worm sensor 105 includes a controller 115, a computer network 110 (e.g., a hidden network), and a gateway 125 (e.g., a wormhole system). The computer network 110 includes one or more computing systems 120 (e.g., hidden systems) in communication with each other. The controller 115 and the gateway 125 are in communication with the computer network 110 and the computing systems 120. Additionally, the gateway 125 is communication with a communication network 130 (e.g., a production network). The communication network 130 can be a public computer network (e.g., the Internet) or a private computer network (e.g., a wireless telecommunication network).

Optionally, the computer worm sensor 105 may include one or more traffic analysis devices 135 in communication with the communication network 130. The traffic analysis device 135 analyzes network traffic in the communication network 130 to identify network communications characteristic of a computer worm. The traffic analysis device 135 can then selectively duplicate the identified network communications and provide the duplicated network communications to the controller 115. The controller 115 replays the duplicated network communications in the computer network 110 to determine whether the network communications include a computer worm.

The computing systems 120 are computing devices typically found in a computer network. For example, the computing systems 120 can include computing clients or servers. As a further example, the computing systems 120 can include gateways and subnets in the computer network 110. Each of the computing systems 120 and the gateway 125 may have different hardware or software profiles.

The gateway 125 allows computer worms to pass from the communication network 130 to the computer network 110. The computer worm sensor 105 may include multiple gateways 125 in communication with multiple communication networks 130. These communication networks 130 may also be in communication with each other. For example, the communication networks 130 can be part of the Internet or in communication with the Internet. In one embodiment, each of the gateways 125 can be in communication with multiple communication networks 130.

The controller 115 controls operation of the computing systems 120 and the gateway 125 to orchestrate network activities in the computer worm sensor 105. In one embodiment, the orchestrated network activities are a predetermined sequence of network activities in the computer network 110, which represents an orchestrated behavior of the computer network 110. In this embodiment, the controller 115 monitors the computer network 110 to determine a monitored behavior of the computer network 110 in response to the orchestrated network activities. The controller 115 then compares the monitored behavior of the computer network 110 with the predetermined orchestrated behavior to identify an anomalous behavior. The anomalous behavior may include a communication anomaly (e.g., an unexpected network communication) or an execution anomaly (e.g., an unexpected execution of computer program code) in the computer network 110. If the controller 115 identifies an anomalous behavior, the computer network 110 is deemed infected with a computer worm. In this way, the controller 115 can detect the presence of a computer worm in the computer network 110 based on an anomalous behavior of the computer worm in the computer network 110. The controller 115 then creates an identifier (i.e., a "definition" of the anomalous behavior), which may be used for detecting the computer worm in another computer network (e.g., the communication network 130).

The identifier determined by the controller 115 for a computer worm in the computer network 110 may be a signature that characterizes an anomalous behavior of the computer worm. The signature can then be used to detect the computer worm in another computer network (e.g., the communication network 130). In one embodiment, the signature indicates a sequence of ports in the computer network 110 along with data used to exploit each of the ports. The signature may be a set of tuples $\{(p_1, c_1), (p_2, c_2), \ldots \}$, where $p_n$ represents a Transfer Control Protocol (TCP) or a User Datagram Protocol (UDP) port number, and $c_n$ is signature data contained in a TCP or UDP packet used to exploit a port associated with the port number. For example, the signature data can be 16-32 bytes of data in a data portion of a data packet.

The controller 115 can determine a signature of a computer worm based on a uniform resource locator (URL), and can generate the signature by using a URL filtering device, which represents a specific case of content filtering. For example, the controller 115 can identify a uniform resource locator (URL) in data packets of Hyper Text Transfer Protocol (HTTP) traffic and can extract a signature from the URL. Further, the controller 115 can create a regular expression for the URL and include the regular expression in the signature. In this way, a URL filtering device can use the signature to filter out network traffic associated with the URL.

Alternatively, the identifier may be a vector (e.g., a propagation vector, an attack vector, or a payload vector) that characterizes an anomalous behavior of the computer worm in the computer network 110. For example, the vector can be a propagation vector (i.e., a transport vector) that characterizes a sequence of paths traveled by the computer worm in the computer network 110. The propagation vector may include a set $\{p_1, p_2, p_3, \ldots \}$, where $p_n$ represents a port number (e.g., a TCP or UDP port number) in the computer network 110 and identifies a transport protocol (e.g., TCP or UDP) used by the computer worm to access the port. Further, the identifier may be a multi-vector that characterizes multiple propagation vectors for the computer worm. In this way, the vector can characterize a computer worm that uses a variety of techniques to propagate in the computer network 110. These techniques may include dynamic assignment of probe addresses to the computing systems 120, network address translation (NAT) of probe addresses to the computing systems 120, obtaining topological service information from the computer network 110, or propagating through multiple gateways 125 of the computer worm sensor 105.

The controller 115 may orchestrate network activities (e.g., network communications or computing services) in the computer network 110 based on one or more orchestration patterns. In one embodiment, the controller 115 generates a series of network communications based on an orchestration pattern to exercise one or more computing services (e.g., Telnet, FTP, or SMTP) in the computer network 110. In this embodiment, the orchestration pattern defines an orchestrated behavior (e.g., an expected behavior) of the computer network 110. The controller 115 then monitors network activities in the computer network 110 (e.g., the network communications and computing services accessed by the network communications) to determine the monitored behavior of the computer network 110, and compares the monitored behavior with the orchestration pattern. If the monitored behavior does not match the orchestration pattern, the computer network 110 is deemed infected with a computer worm. The controller 115 then identifies an anomalous behavior in the monitored behavior (e.g., a network activity in the monitored behavior that does not match the orchestration pattern) and determines an identifier for the computer worm based on the anomalous behavior.

In another embodiment, an orchestrated pattern is associated with a type of network communication. In this embodiment, the gateway 125 identifies the type of a network communication received by the gateway 125 from the communication network 130 before propagating the network communication to the computer network 110. The controller 115 then selects an orchestration pattern based on the type of network communication identified by the gateway 125 and orchestrates network activities in the computer network 110 based on the selected orchestration pattern. In the computer network 110, the network communication accesses one or more computing systems 120 via one or more ports to access one or more computing services (e.g., network services) provided by the computing systems 120. For example, the network communication may access an FTP server on one of the computing systems 120 via a well-known or registered FTP port number using an appropriate network protocol (e.g., TCP or UDP). In this example, the orchestration pattern includes the identity of the computing system 120, the FTP port number, and the appropriate network protocol for the FTP server. If the monitored behavior of the computer network 110 does not match the orchestrated behavior defined by the orchestration pattern, the network communication is deemed infected with a computer worm. The controller 115 then determines an identifier for the computer worm based on the monitored behavior, as is described in more detail herein.

The controller 115 orchestrates network activities in the computer network 110 such that detection of anomalous behavior in the computer network 110 is simple and highly reliable. All behavior (e.g., network activities) of the computer network 110 that is not part of an orchestration pattern represents an anomalous behavior. In alternative embodiments, the monitored behavior of the computer network 110 that is not part of the orchestration pattern is analyzed to determine whether any of the monitored behavior is an anomalous behavior.

In another embodiment, the controller 115 periodically orchestrates network activities in the computer network 110 to access various computing services (e.g., web servers or file servers) in the communication network 130. In this way, a computer worm that has infected one of these computing services may propagate from the communication network 130 to the computer network 110 via the orchestrated network activities. The controller 115 then orchestrates network activities to access the same computing services in the computer network 110 and monitors a behavior of the computer network 110 in response to the orchestrated network activities. If the computer worm has infected the computer network 110, the controller 115 detects the computer worm based on an anomalous behavior of the computer worm in the monitored behavior, as is described more fully herein.

In one embodiment, a single orchestration pattern exercises all available computing services in the computer network 110. In other embodiments, each orchestration pattern exercises selected computing services in the computer network 110, or the orchestration patterns for the computer network 110 are dynamic (e.g., vary over time). For example, a user of the computer worm sensor 105 may add, delete, or modify the orchestration patterns to change the orchestrated behavior of the computer network 110.

In one embodiment, the controller 115 orchestrates network activities in the computer network 110 to prevent a computer worm in the communication network 130 from detecting the computer network 110. For example, a computer worm may identify and avoid inactive computer networks, which may be decoy computer networks deployed for detecting the computer worm (e.g., the computer network 110). In this embodiment, the controller 115 orchestrates network activities in the computer network 110 to prevent the computer worm from avoiding the computer network 110 because of inactivity in the computer network 110.

In another embodiment, the controller 115 analyzes both the packet header and the data portion of data packets in network communications in the computer network 110 to detect anomalous behavior in the computer network 110. For example, the controller 115 can compare the packet header and the data portion of the data packets with an orchestration pattern to determine whether the data packets constitute anomalous behavior in the computer network 110. Because the network communication containing the data packets is an orchestrated behavior of the computer network 110, the controller 115 avoids false positive detection of anomalous behavior in the computer network 110, which may occur in anomaly detection systems operating on unconstrained computer networks. In this way, the controller 115 reliably detects computer worms in the computer network 110 based on the anomalous behavior.

To illustrate what is meant by reliable detection of anomalous behavior, for example, an orchestration pattern may be used that is expected to cause emission of a sequence of data packets (a, b, c, d) in the computer network 110. The controller 115 orchestrates network activities in the computer network 110 based on the orchestration pattern and monitors the behavior (e.g., measures the network traffic) of the computer network 110. If the monitored behavior (e.g., the measured network traffic) of the computer network 110 includes a sequence of data packets (a, b, c, d, e, f), the data packets (e, f) represent an anomalous behavior (e.g., anomalous traffic) in the computer network 110. This anomalous behavior may be caused by an active computer worm propagating inside the computer network 110.

As another example, if an orchestration pattern is expected to cause emission of a sequence of data packets (a, b, c, d) in the computer network 110, but the monitored behavior includes a sequence of data packets (a, b', c', d), the data packets (b', c') represents an anomalous behavior in the computer network 110. This anomalous behavior may be caused by a passive computer worm propagating inside the computer network 110.

In various further embodiments, the controller 115 generates a recovery script for the computer worm, as is described more fully herein. The controller 115 can then execute the recovery script to disable (e.g., destroy) the computer worm in the computer worm sensor 105 (e.g., remove the computer worm from the computing systems 120 and the gateway 125).

Moreover, the controller 115 can output the recovery script for use in disabling the computer worm in other infected computer networks and systems.

In another embodiment, the controller 115 identifies the source of a computer worm based on a network communication containing the computer worm. For example, the controller 115 may identify an infected host (e.g., a computing system) in the communication network 130 that generated the network communication containing the computer worm. In this example, the controller 115 transmits the recovery script via the gateway 125 to the host in the communication network 130. In turn, the host executes the recovery script to disable the computer worm in the host. In various further embodiments, the recovery script is also capable of repairing damage to the host caused by the computer worm.

The computer worm sensor 105 may store the recovery script in a bootable compact disc (CD) or floppy that can be loaded into infected hosts (e.g., computing systems) to repair the infected hosts. For example, the recovery script can include an operating system for the infected host and repair scripts that are invoked as part of the booting process of the operating system to repair an infected host. Alternatively, the computer worm sensor 130 may provide the recovery script to an infected computer network (e.g., the communication network 130) so that the computer network 130 can direct infected hosts in the communication network 130 to reboot and load the operating system in the recovery script.

In another embodiment, the computer worm sensor 105 uses a per-host detection and recovery mechanism to recover hosts (e.g., computing systems) in a computer network (e.g., the communication network 130). The computer worm sensor 105 generates a recovery script including a detection process for detecting the computer worm and a recovery process for disabling the computer worm and repairing damage caused by the computer worm. The computer worm sensor 105 provides the recovery script to hosts in a computer network (e.g., the communication network 130) and each host executes the detection process. If the host detects the computer worm, the host then executes the recovery process. In this way, a computer worm that performs random corruptive acts on the different hosts (e.g., computing systems) in the computer network can be disabled in the computer network and damage to the computer network caused by the computer worm can be repaired.

The computer worm sensor 105 may be a single integrated system, such as a network device or a network appliance, which is deployed in the communication network 130 (e.g., commercial or military computer network). Alternatively, the computer worm sensor 105 may include integrated software for controlling operation of the computer worm sensor 105, such that per-host software (e.g., individual software for each computing system 120 and gateway 125) is not required.

The computer worm sensor 105 may be a hardware module, such as a combinational logic circuit, a sequential logic circuit, a programmable logic device, or a computing device, among others. Alternatively, the computer worm sensor 105 may include one or more software modules containing computer program code, such as a computer program, a software routine, binary code, or firmware, among others. The software code may be contained in a permanent memory storage device such as a compact disc read-only memory (CD-ROM), a hard disk, or other memory storage device. In various embodiment, the computer worm sensor 105 includes both hardware and software modules.

In various embodiments, the computer worm sensor 105 is substantially transparent to the communication network 130 and does not substantially affect the performance or availability of the communication network 130. For example, the software in the computer worm sensor 105 may be hidden such that a computer worm cannot detect the computer worm sensor 105 by checking for the existence of files (e.g., software programs) in the computer worm sensor 105 or by performing a simple signature check of the files. In other embodiments, the software configuration of the computer worm sensor 105 is hidden by employing one or more well-known polymorphic techniques used by viruses to evade signature based detection.

In another embodiment, the gateway 125 facilitates propagation of computer worms from the communication network 130 to the computer network 110, with the controller 115 orchestrating network activities in the computer network 110 to actively propagate a computer worm from the communication network 130 to the computer network 110. For example, the controller 115 can originate one or more network communications between the computer network 110 and the communication network 130. In this way, a passive computer worm in the communication network 130 can attach to one of the network communications and propagate along with the network communication from the communication network 130 to the computer network 110. Once the computer worm is in the computer network 110, the controller 115 can detect the computer worm based on an anomalous behavior of the computer worm, as is described in more fully herein.

In another embodiment, the gateway 125 selectively prevents normal network traffic (e.g., network traffic not generated by a computer worm) from propagating from the communication network 130 to the computer network 110 to prevent various anomalies or perturbations in the computer network 110. In this way, the orchestrated behavior of the computer network 110 may be simplified and the reliability of computer worm sensor 105 may be increased. For example, the gateway 125 can prevent Internet Protocol (IP) data packets from being routed from the communication network 130 to the computer network 110. Alternatively, the gateway 125 can prevent broadcast and multicast network communications from being transmitted from the communication network 130 to the computer network 110, prevent communications generated by remote shell applications (e.g., Telnet) in the communication network 130 from propagating to the computer network 110, or exclude various application level gateways including proxy services that are typically present in a computer network for application programs in the computer network. Such application programs may include a Web browser, an FTP server and a mail server, and the proxy services may include the Hypertext Markup Language (HTML), the File Transfer Protocol (FTP), or the Simple Mail Transfer Protocol (SMTP)).

In another embodiment, the computing systems 120 and the gateway 125 are virtual computing systems. For example, the computing systems 120 may be implemented as virtual systems using machine virtualization technologies such as VMware™ sold by VMware, Inc. In another embodiment, the virtual systems include VM software profiles and the controller 115 automatically updates the VM software profiles to be representative of the communication network 130. The gateway 125 and the computer network 110 may also be implemented as a combination of virtual systems and real systems.

In another embodiment, the computer network 110 is a virtual computer network. The computer network 110 includes network device drivers (e.g., special purpose network device drivers) that do not access a physical network, but instead use software message passing between the different virtual computing systems 120 in the computer network 110. The network device drivers may log data packets of network communications in the computer network 110, which represent the monitored behavior of the computer network 110.

In various embodiments, the computer worm sensor 105 establishes a software environment of the computer network 110 (e.g., computer programs in the computing systems 120) to reflect a software environment of a selected computer network (e.g., the communication network 130). For example, the computer worm sensor 105 can select a software environment of a computer network typically attacked by computer worms (e.g., a software environment of a commercial communication network) and can configure the computer network 110 to reflect that software environment. In a further embodiment, the computer worm sensor 105 updates the software environment of the computer network 110 to reflect changes in the software environment of the selected computer network. In this way, the computer worm sensor 105 can effectively detect a computer worm that targets a recently deployed software program or software profile in the software environment (e.g., a widely deployed software profile).

The computer worm sensor 105 may also monitor the software environment of the selected computer network and automatically update the software environment of the computer network 110 to reflect the software environment of the selected computer network. For example, the computer worm sensor 105 can modify the software environment of the computer network 110 in response to receiving an update for a software program (e.g., a widely used software program) in the software environment of the selected computer network.

In another embodiment, the computer worm sensor 105 has a probe mechanism to automatically check the version, the release number, and the patch-level of major operating systems and application software components installed in the communication network 130. Additionally, the computer worm sensor 110 has access to a central repository of up-to-date versions of the system and application software components. In this embodiment, the computer worm sensor 110 detects a widely used software component (e.g., software program) operating in the communication network 130, downloads the software component from the central repository, and automatically deploys the software component in the computer network 110 (e.g., installs the software component in the computing systems 120). The computer worm sensor 105 may coordinate with other computer worm sensors 105 to deploy the software component in the computer networks 110 of the computer worm sensors 105. In this way, each software environment of the computer worm sensors 105 is modified to contain the software component.

In another embodiment, the computer worm sensors 105 are automatically updated from a central computing system (e.g., a computing server) by using a push model. In this embodiment, the central computing system obtains updated software components and sends the updated software components to the computer worm sensors 105. Moreover, the software environments of the computer worm sensors 105 can represent widely deployed software that computer worms are likely to target. Examples of available commercial technologies that can aid in the automated update of software and software patches in a networked environment include N1 products sold by SUN Microsystems, Inc™ and Adaptive Infrastructure products sold by the Hewlett Packard Company™.

The computer worm sensor 105 may maintain an original image of the computer network 110 (e.g., a copy of the original file system for each computing system 120) in a virtual machine that is isolated from the computer network 110 and the communication network 130 (e.g., not connected to the computer network 110 or the communication network 130). The computer worm sensor 105 obtains a current image of an infected computing system 120 (e.g., a copy of the current file system of the computing system 120) and compares the current image with the original image of the computer network 110 to identify any discrepancies between these images, which represent an anomalous behavior of a computer worm in the infected computing system 120.

The computer worm sensor 105 generates a recovery script based on the discrepancies between the current image and the original image of the computing system 120, which may be used for disabling the computer worm in the infected computing system 120 and repairing damage to the infected computing system 120 caused by the computer worm. For example, the recovery script may include computer program code for identifying infected software programs or memory locations based on the discrepancies, and removing the discrepancies from the infected software programs or memory locations. The infected computing system 120 can then execute the recovery script to disable (e.g., destroy) the computer worm and repair any damage to the infected computing system 120 caused by the computer worm.

The recovery script may include computer program code for replacing the current file system of the computing system 120 with the original file system of the computing system 120 in the original image of the computer network 110. Alternatively, the recovery script may include computer program code for replacing infected files with the corresponding original files of the computing system 120 in the original image of the computer network 110. In still another embodiment, the computer worm sensor 105 includes a file integrity checking mechanism (e.g., a tripwire) for identifying infected files in the current file system of the computing system 120. The recovery script may also include computer program code for identifying and restoring files modified by a computer worm to reactivate the computer worm during reboot of the computing system 120 (e.g., reactivate the computer worm after the computer worm is disabled).

In one embodiment, the computer worm sensor 105 occupies a predetermined address space (e.g., an unused address space) in the communication network 130. The communication network 130 redirects those network communications directed to the predetermined address space to the computer worm sensor 105. For example, the communication network 130 can redirect network communications to the computer worm sensor 105 by using various IP layer redirection techniques. In this way, an active computer worm using a random IP address scanning technique (e.g., a scan directed computer worm) can randomly select an address in the predetermined address space and can infect the computer worm sensor 105 based on the selected address (e.g., transmitting a network communication containing the computer worm to the selected address).

An active computer worm can select an address in the predetermined address space based on a previously generated list of target addresses (e.g., a hit-list directed computer worm) and can infect a computing system 120 located at the selected address. Alternatively, an active computer worm can identify a target computing system 120 located at the selected address in the predetermined address space based on a previously generated list of target systems, and then infect the target computing system 120 based on the selected address.

In various embodiments, the computer worm sensor 105 identifies data packets directed to the predetermined address space and redirects the data packets to the computer worm sensor 105 by performing network address translation (NAT) on the data packets. For example, the computer network 110 may perform dynamic NAT on the data packets based on one or more NAT tables to redirect data packets to one or more computing systems 120 in the computer network 110. In the case of a hit-list directed computer worm having a hit-list that does not have a network address of a computing system 120 in the computer network 110, the computer network 110 can perform NAT to redirect the hit-list directed computer worm to one of the computing systems 120. Further, if the computer worm sensor 105 initiates a network communication that is not defined by the orchestrated behavior of the computer network 110, the computer network 110 can dynamically redirect the data packets of the network communication to a computing system 120 in the computer network 110.

In another embodiment, the computer worm sensor 105 operates in conjunction with dynamic host configuration protocol (DHCP) servers in the communication network 130 to occupy an address space in the communication network 130. In this embodiment, the computer worm sensor 105 communicates with each DHCP server to determine which IP addresses are unassigned to a particular subnet associated with the DHCP server in the communication network 130. The computer worm sensor 105 then dynamically responds to network communications directed to those unassigned IP addresses. For example, the computer worm sensor 105 can dynamically generate an address resolution protocol (ARP) response to an ARP request.

In another embodiment, the traffic analysis device 135 analyzes communication traffic in the communication network 130 to identify a sequence of network communications characteristic of a computer worm. The traffic analysis device 135 may use one or more well-known worm traffic analysis techniques to identify a sequence of network communications in the communication network 130 characteristic of a computer worm. For example, the traffic analysis device 135 may identify a repeating pattern of network communications based on the destination ports of data packets in the communication network 130. The traffic analysis device 135 duplicates one or more network communications in the sequence of network communications and provides the duplicated network communications to the controller 115, which emulates the duplicated network communications in the computer network 110.

The traffic analysis device 135 may identify a sequence of network communications in the communication network 130 characteristic of a computer worm by using heuristic analysis techniques (i.e., heuristics) known to those skilled in the art. For example, the traffic analysis device 135 may detect a number of IP address scans, or a number of network communications to an invalid IP address, occurring within a predetermined period. The traffic analysis device 135 determines whether the sequence of network communications is characteristic of a computer worm by comparing the number of IP address scans or the number of network communications in the sequence to a heuristics threshold (e.g., one thousand IP address scans per second).

The traffic analysis device 135 may lower typical heuristics thresholds of these heuristic techniques to increase the rate of computer worm detection, which may also increase the rate of false positive computer worm detection by the traffic analysis device 135. Because the computer worm sensor 105 emulates the duplicated network communications in the computer network 110 to determine whether the network communications include an anomalous behavior of a computer worm, the computer worm sensor 105 may increase the rate of computer worm detection without increasing the rate of false positive worm detection.

In another embodiment, the traffic analysis device 135 filters network communications characteristic of a computer worm in the communication network 130 before providing duplicating network communications to the controller 115. For example, a host A in the communication network 130 can send a network communication including an unusual data byte sequence (e.g., worm code) to a TCP/UDP port of a host B in the communication network 130. In turn, the host B can send a network communication including a similar unusual data byte sequence to the same TCP/UDP port of a host C in the communication network 130. In this example, the network communications from host A to host B and from host B to host C represent a repeating pattern of network communication. The unusual data byte sequences may be identical data byte sequences or highly correlated data byte sequences. The traffic analysis device 135 filters the repeating pattern of network communications by using a correlation threshold to determine whether to duplicate the network communication and provide the duplicated network communication to the controller 115.

The traffic analysis device 135 may analyze communication traffic in the communication network 130 for a predetermined period. For example, the predetermined period can be a number of seconds, minutes, hours, or days. In this way, the traffic analysis device 135 can detect slow propagating computer worms as well as fast propagating computer worms in the communication network 130.

The computer worm sensor 105 may contain a computer worm (e.g., a scanning computer worm) within the computer network 110 by performing dynamic NAT on an unexpected network communication originating in the computer network 110 (e.g., an unexpected communication generated by a computing system 120). For example, the computer worm sensor 105 can perform dynamic NAT on data packets of an IP address range scan originating in the computer network 110 to redirect the data packets to a computing system 120 in the computer network 110. In this way, the network communication is contained in the computer network 110.

In another embodiment, the computer worm sensor 105 is topologically knit into the communication network 130 to facilitate detection of a topologically directed computer worm. The controller 115 may use various network services in the communication network 130 to topologically knit the computer worm sensor 105 into the communication network 130. For example, the controller 115 may generate a gratuitous ARP response including the IP address of a computing system 120 to the communication network 130 such that a host in the communication network 130 stores the IP address in an ARP cache. In this way, the controller 115 plants the IP address of the computing system 120 into the communication network 130 to topologically knit the computing system 120 into the communication network 130.

The ARP response generated by the computer worm sensor 105 may include a media access control (MAC) address and a corresponding IP address for one or more of the computing systems 120. A host (e.g., a computing system) in the communication network 130 can then store the MAC and IP addresses in one or more local ARP caches. A topologically directed computer worm can then access the MAC and IP addresses in the ARP caches and can target the computing systems 120 based on the MAC or IP addresses.

In various embodiments, the computer worm sensor 105 can accelerate network activities in the computer network 110. In this way, the computer worm sensor 105 can reduce the time for detecting a time-delayed computer worm (e.g., the CodeRed-II computer worm) in the computer network 110. Further, accelerating the network activities in the computer network 110 may allow the computer worm sensor 105 to detect the time-delayed computer worm before the time-delayed computer worm causes damage in the communication network 130. The computer worm sensor 105 can then generate a recovery script for the computer worm and provide the recovery script to the communication network 130 for disabling the computer worm in the communication network 130.

The computing system 120 in the computer network may accelerate network activities by intercepting time-sensitive system calls (e.g., "time-of-day" or "sleep" system calls) generated by a software program executing in the computing system 120 or responses to such systems calls, and modifying the systems calls or responses to accelerate execution of the software program. For example, the computing system 120 can modify a parameter of a "sleep" system call to reduce the execution time of this system call or modify the time or date in a response to a "time-of-day" system call to a future time or date. Alternatively, the computing system 120 can identify a time consuming program loop (e.g., a long, central processing unit intensive while loop) executing in the computing system 120 and can increase the priority of the software program containing the program loop to accelerate execution of the program loop.

In various embodiments, the computer worm sensor 105 includes one or more computer programs for identifying execution anomalies in the computing systems 120 (e.g., anomalous behavior in the computer network 110) and distinguishing a propagation vector of a computer worm from spurious traffic (e.g. chaff traffic) generated by the computer worm. In one embodiment, the computing systems 120 execute the computing programs to identify execution anomalies occurring in the computing network 110. The computer worm sensor 105 correlates these execution anomalies with the monitored behavior of the computer worm to distinguish computing processes (e.g., network services) that the computer worm exploits for propagation purposes from computing processes that only receive benign network traffic from the computer worm. The computer worm sensor 105 then determines a propagation vector of the computer worm based on the computing processes that the computer worm propagates for exploitative purposes. In a further embodiment, each computing system 120 executing one of the computer programs function as an intrusion detection system (IDS) by generating a computer worm intrusion indicator in response to detecting an execution anomaly.

In one embodiment, the computer worm sensor 105 tracks system call sequences to identify an execution anomaly in the computing system 120. For example, the computer worm sensor 105 can use finite state automata techniques to identify an execution anomaly. Additionally, the computer worm system 105 may identify an execution anomaly based on call-stack information for system calls executed in a computing system 120. For example, a call-stack execution anomaly may occur when a computer worm executes system calls from the stack or the heap of the computing system 120. The computer worm system 105 may also identify an execution anomaly based on virtual path identifiers in the call-stack information.

The computer worm system 105 may monitor transport level ports of a computing system 120. For example, the computer worm sensor 105 can monitor systems calls (e.g., "bind" or "recvfrom" system calls) associated with one or more transport level ports of a computing process in the computing system 120 to identify an execution anomaly. If the computer worm system 105 identifies an execution anomaly for one of the transport level ports, the computer worm sensor 105 includes the transport level port in the identifier (e.g., a signature or a vector) of the computer worm, as is described more fully herein.

In another embodiment, the computer worm sensor 105 analyzes binary code (e.g., object code) of a computing process in the computing system 120 to identify an execution anomaly. The computer worm system 105 may also analyze the call stack and the execution stack of the computing system 120 to identify the execution anomaly. For example, the computer worm sensor 105 may perform a static analysis on the binary code of the computing process to identify possible call stacks and virtual path identifiers for the computing process. The computer worm sensor 105 then compares an actual call stack with the identified call stacks to identify a call stack execution anomaly in the computing system 120. In this way, the computer worm sensor 105 can reduce the number of false positive computer worm detections (e.g., detection of computer worms not in the computing system 120) and false negative computer worm detections (i.e., failure to detect computer worms in the computing system 120). Moreover, if the computer worm sensor 105 can identify all possible callstacks and virtual path identifiers for the computing process, the computer worm sensor 105 can have a zero false positive rate of computer worm detection.

In another embodiment, the computer worm sensor 105 identifies one or more anomalous program counters in the call stack. For example, an anomalous program counter can be the program counter of a system call generated by worm code of a computer worm. The computer worm sensor 105 tracks the anomalous program counters and determines an identifier for detecting the computer worm based on the anomalous program counters. Additionally, the computer worm sensor 105 may determine whether a memory location (e.g., a memory address or a memory page) referenced by the program counter is a writable memory location. The computer worm sensor 105 then determines whether the computer worm has exploited the memory location. For example, a computer worm can store worm code into a memory location by exploiting a vulnerability of the computing system 120 (e.g., a buffer overflow mechanism).

The computer worm sensor 105 may take a snapshot of data in the memory around the memory location referenced by the anomalous program counter. The computer worm sensor 105 then searches the snapshot for data in recent data packets received by the computing process (e.g., computing thread) associated with the anomalous program counter. The computer worm sensor 105 searches the snapshot by using a searching algorithm to compare data in the recent data packets with a sliding window of data (e.g., 16 bytes of data) in the snapshot. If the computer worm sensor 105 finds a match between the data in a recent data packet and the data in the sliding window, the matching data is deemed a signature candidate for the computer worm.

In another embodiment, the computing system 120 tracks the integrity of computing code in a computing system 120 to identify an execution anomaly in the computing system 120. The computing system 120 associates an integrity value with data stored in the computing system 120 to identify the source of the data. If the data is from a known source (e.g., a computing program) in the computing system 120, the integrity value is set to one, otherwise the integrity value is set to zero. For example, data received by the computing system 120 in a network communication is associated with an integrity value of zero. The computing system 120 stores the integrity value along with the data in the computing system 120, and monitors a program counter in the computing system 120 to identify an execution anomaly based on the integrity value. A program counter having an integrity value of zero indicates that data from a network communication is stored in the program counter, which represents an execution anomaly in the computing system 120.

The computing system 120 may use the signature extraction algorithm to identify a decryption routine in the worm code of a polymorphic worm, such that the decryption routine is deemed a signature candidate of the computer worm. Additionally, the computer worm sensor 105 may compare signature candidates identified by the computing systems 120 in the computer worm sensor 105 to determine an identifier for detecting the computer worm. For example, the computer worm sensor 105 can identify common code portions in the signature candidates to determine an identifier for detecting the computer worm. In this way, the computer worm sensor 105 can determine an identifier of a polymorphic worm containing a mutating decryption routine (e.g., polymorphic code).

In another embodiment, the computer worm sensor 105 monitors network traffic in the computer network 110 and compares the monitored network traffic with typical network traffic patterns occurring in a computer network to identify anomalous network traffic in the computer network 110. The computer worm sensor 105 determines signature candidates based on data packets of the anomalous network traffic (e.g., extracts signature candidates from the data packets) and determines identifiers for detecting the computer worms based on the signature candidates.

In another embodiment, the computer worm sensor 105 evaluates characteristics of a signature candidate to determine the quality of the signature candidate, which indicates an expected level of false positive computer worm detection in a computer network (e.g., the communication network 130). For example, a signature candidate having a high quality is not contained in data packets of typical network traffic occurring in the computer network. Characteristics of a signature candidate include a minimum length of the signature candidate (e.g., 16 bytes of data) and an unusual data byte sequence. In one embodiment, the computer worm sensor 105 performs statistical analysis on the signature candidate to determine whether the signature candidate includes an unusual byte sequence. For example, computer worm sensor 105 can determine a correlation between the signature candidate and data contained in typical network traffic. In this example, a low correlation (e.g., zero correlation) indicates a high quality signature candidate.

In another embodiment, the computer worm sensor 105 identifies execution anomalies by detecting unexpected computing processes in the computer network 110 (i.e., computing processes that are not part of the orchestrated behavior of the computing network 110). The operating systems in the computing systems 120 may be configured to detect computing processes that are not in a predetermined collection of computing processes. In another embodiment, a computing system 120 is configured as a network server that permits a host in the communication network 130 to remotely executed commands on the computing system 120. For example, the original Morris computer worm exploited a debug mode of sendmail that allowed remote command execution in a mail server.

In some cases, the intrusion detection system of the computer worm sensor 105 detects an active computer worm based on anomalous network traffic in the computer network 110, but the computer worm sensor 105 does not detect an execution anomaly caused by a computing process in the computer network 110. In these cases, the computer worm sensor 105 determines whether the computer worm has multiple possible transport vectors based on the ports being accessed by the anomalous network traffic in the computer network 110. If the computer network 110 includes a small number (e.g., one or two) of ports, the computer worm sensor 105 can use these ports to determine a vector for the computer worm. Conversely, if the computer network 110 includes many ports (e.g., three or more ports), the computer worm sensor 105 partitions the computing services in the computer network 110 at appropriate control points to determine those ports exploited by the computer worm.

The computer worm sensor 105 may randomly blocks ports of the computing systems 120 to suppress traffic to these blocked ports. Consequently, a computer worm having a transport vector that requires one or more of the blocked ports will not be able to infect a computing system 120 in which those ports are blocked. The computer worm sensor 105 then correlates the anomalous behavior of the computer worm across the computing systems 120 to determine which ports the computer worm has used for diversionary purposes (e.g., emitting chaff) and which ports the computer worm has used for exploitive purposes. The computer worm sensor 105 then determines a transport vector of the computer worm based on the ports that the computer worm has used for exploitive purposes.

Figure 2:
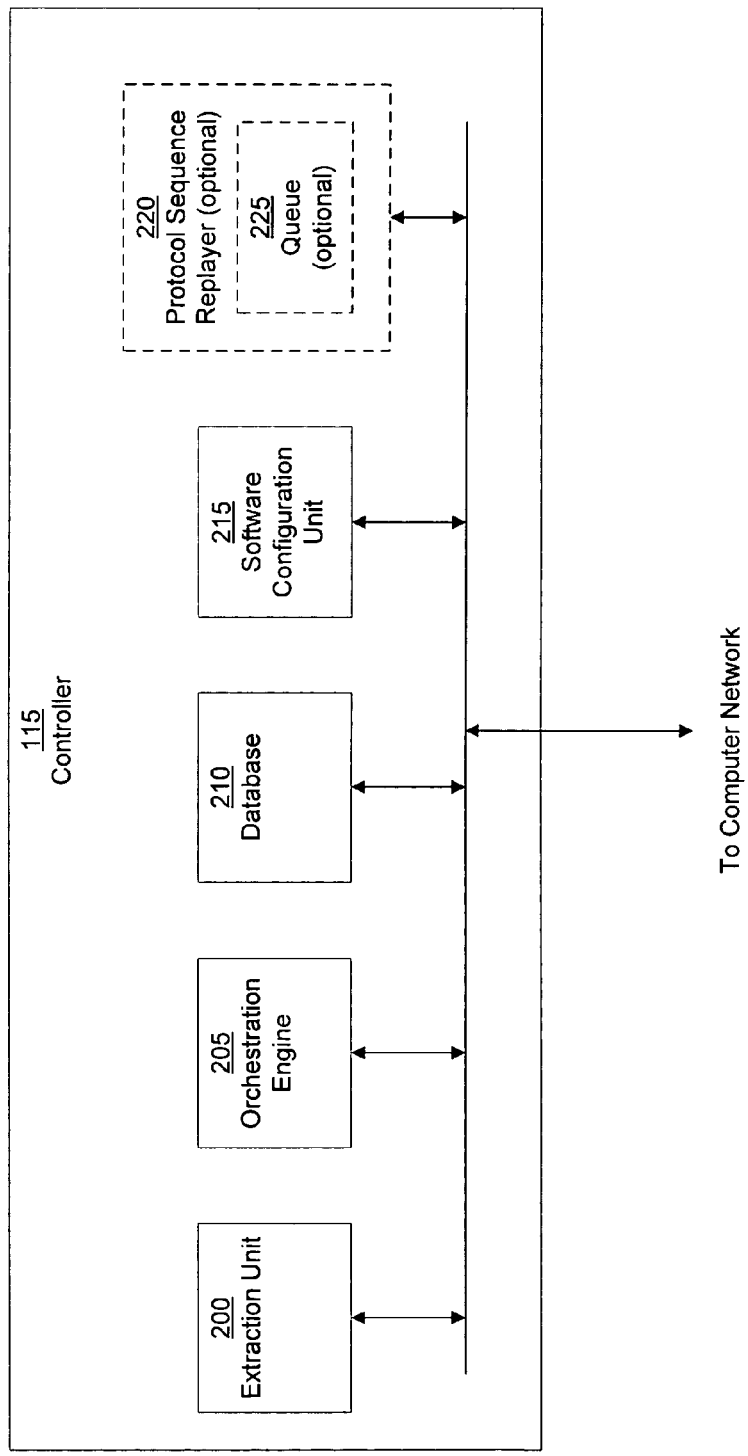
FIG. 2 depicts a controller of a computer worm sensor, in accordance with one embodiment of the present invention.

FIG. 2 depicts an exemplary embodiment of the controller 115. The controller 115 includes an extraction unit 200, an orchestration engine 205, a database 210, and a software configuration unit 215. The extraction unit 200, the orchestration engine 205, the database 210, and the computer network 110 (FIG. 1) are in communication with each other and with the computer network 110. Optionally, the controller 115 includes a protocol sequence replayer 220 in communication with the computer network 110 and the traffic analysis device 135 (FIG. 1).

In various embodiments, the orchestration engine 205 controls the state and operation of the computer worm sensor 105 (FIG. 1). In one embodiment, the orchestration engine 205 configures the computing systems 120 (FIG. 1) and the gateway 125 (FIG. 1) to operate in a predetermined manner in response to network activities occurring in the computer network 110, and generates network activities in the computer network 110 and the communication network 130 (FIG. 1). In this way, the orchestration engine 205 orchestrates network activities in the computer network 110. For example, the orchestration engine 205 may orchestrate network activities in the computer network 110 by generating an orchestration sequence (e.g., a predetermined sequence of network activities) among various computing systems 120 in the computer network 110, including network traffic that typically occurs in the communication network 130.

In one embodiment, the orchestration engine 205 sends orchestration requests (e.g., orchestration patterns) to various orchestration agents (e.g., computing processes) in the computing systems 120. The orchestration agent of a computing system 120 performs a periodic sweep of computing services (e.g., network services) in the computing system 120 that are potential targets of a computer worm attack. The computing services in the computing system 120 may includes typical network services (e.g., web service, FTP service, mail service, instant messaging, or Kazaa) that are also in the communication network 130.

The orchestration engine 205 may generate a wide variety of orchestration sequences to exercise a variety of computing services in the computer network 110, or may select orchestration patterns to avoid loading the communication network 110 with orchestrated network traffic. Additionally, the orchestration engine 205 may select the orchestration patterns to vary the orchestration sequences. In this way, a computer worm is prevented from scanning the computer network 110 to predict the behavior of the computer network 110.

In various embodiments, the software configuration unit 215 dynamically creates or destroys virtual machines (VMs) or VM software profiles in the computer network 110, and may initialize or update the software state of the VMs or VM software profiles. In this way, the software configuration unit 215 configures the computer network 110 such that the controller 115 can orchestrate network activities in computer network 110 based on one or more orchestration patterns. It is to be appreciated that the software configuration unit 215 is optional in various embodiments of the computer worm sensor 105.

In various embodiments, the extraction unit 200 determines an identifier for detecting the computer worm. In these embodiments, the extraction unit 200 can extract a signature or a vector of the computer worm based on network activities (e.g., an anomalous behavior) occurring in the computer network 110, for example from data (e.g., data packets) in a network communication.

The database 210 stores data for the computer worm sensor 105, which may include a configuration state of the computer worm sensor 105. For example, the configuration state may include orchestration patterns or "golden" software images of computer programs (i.e., original software images uncorrupted by a computer worm exploit). The data stored in the database 210 may also includes identifiers or recovery scripts for computer worms, or identifiers for the sources of computer worms in the communication network 130. The identifier for the source of each computer worm may be associated with the identifier and the recovery script of the computer worm.

The protocol sequence replayer 220 receives a network communication from the traffic analysis device 135 (FIG. 1) representing a network communication in the communication network 130 and replays (i.e., duplicates) the network communication in the computer network 110. The protocol sequence replayer 220 may receive the network communication from the traffic analysis device 125 via a private encrypted network (e.g., a virtual private network) within the communication network 130 or via another communication network. The controller 115 monitors the behavior of the computer network 110 in response to the network communication to determine a monitored behavior of the computer network 110 and determine whether the monitored behavior includes an anomalous behavior, as is described more fully herein.

In one embodiment, the protocol sequence replayer 220 includes a queue 225 for storing network communications. The queue 225 receives network a communication from the traffic analysis device 135 and temporarily stores the network communication until the protocol sequence replayer 220 is available to replay the network communication. In another embodiment, the protocol sequence replayer 220 is a computing system 120 in the computer network 110. For example, the protocol sequence replayer 200 may be a computer server including computer program code for replaying network communications in the computer network 110.

In another embodiment, the protocol sequence replayer 220 is in communication with a port (e.g., connected to a network port) of a network device in the communication network 130 and receives duplicated network communications occurring in the communication network 130 from the port. For example, the port can be a Switched Port Analyzer (SPAN) port of a network switch or a network router in the communication network 130, which duplicates network traffic in the communication network 130. In this way, various types of active and passive computer worms (e.g., hit-list directed, topologically-directed, server-directed, and scan-directed computer worms) may propagate from the communication network 130 to the computer network 110 via the duplicated network traffic.

The protocol sequence replayer 220 replays the data packets in the computer network 110 by sending the data packets to a computing system 120 having the same class (e.g., Linux or Windows platform) as the original target system of the data packets. In various embodiments, the protocol network replayer 220 synchronizes any return network traffic generated by the computing system 120 in response to the data packets. The protocol sequence replayer 220 may suppress (e.g., discard) the return network traffic such that the return network traffic is not transmitted to a host in the communication network 130. In one embodiment, the protocol sequence replayer 220 replays the data packets by sending the data packets to the computing system 120 via a TCP connection or UDP session. In this embodiment, the protocol sequence replayer 220 synchronizes return network traffic by terminating the TCP connection or UDP session.

The protocol sequence replayer 220 may modify destination IP addresses of data packets in the network communication to one or more IP addresses of the computing systems 120 and replay (i.e., generate) the modified data packets in the computer network 110. The controller 115 monitors the behavior of the computer network 110 in response to the modified data packets, and may detect an anomalous behavior in the monitored behavior, as is described more fully herein. If the controller 115 identifies an anomalous behavior, the computer network 110 is deemed infected with a computer worm and the controller 115 determines an identifier for the computer worm, as is described more fully herein.

The protocol sequence replayer 220 may analyze (e.g., examine) data packets in a sequence of network communications in the communication network 130 to identify a session identifier. The session identifier identifies a communication session for the sequence of network communications and can distinguish the network communications in the sequence from other network communications in the communication network 130. For example, each communication session in the communication network 130 can have a unique session identifier. The protocol sequence replayer 220 may identify the session identifier based on the communication protocol of the network communications in the sequence. For example, the session identifier may be in a field of a data packet header as specified by the communication protocol. Alternatively, the protocol sequence replayer 220 may infer the session identifier from repeating network communications in the sequence. For example, the session identifier is typically one of the first fields in an application level communication between a client and a server (e.g., computing system 120) and is repeatedly used in subsequent communications between the client and the server.

The protocol sequence replayer 220 may modify the session identifier in the data packets of the sequence of network communications. The protocol sequence replayer 220 generates an initial network communication in the computer network 110 based on a selected network communication in the sequence, and the computer network 110 (e.g., a computing system 120) generates a response including a session identifier. The protocol sequence replayer 220 then substitutes the session identifier in the remaining data packets of the network communication with the session identifier of the response. In a further embodiment, the protocol sequence replayer 220 dynamically modifies session variables in the data packets, as is appropriate, to emulate the sequence of network communications in the computer network 110.

The protocol sequence replayer 220 may determine the software or hardware profile of a host (e.g., a computing system) in the communication network 130 to which the data packets of the network communication are directed. The protocol sequence replayer 220 then selects a computing system 120 in the computer network 110 that has the same software or hardware profile of the host and performs dynamic NAT on the data packets to redirect the data packets to the selected computing system 120. Alternatively, the protocol sequence replayer 220 randomly selects a computing system 120 and performs dynamic NAT on the data packets to redirect the data packets to the randomly selected computing system 120.

In one embodiment, the traffic analysis device 135 can identify a request (i.e., a network communication) from a web browser to a web server in the communication network 130, and a response (i.e., a network communication) from the web server to the web browser. In this case, the response may include a passive computer worm. The traffic analysis device 135 may inspect web traffic on a selected network link in the communication network 130 to identify the request and response. For example, the traffic analysis device 135 may select the network link or identify the request based on a policy. The protocol sequence replayer 220 orchestrates the request in the computer network 110 such that a web browser in a computing system 120 indicates a substantially similar request. In response to this request, the protocol sequence replayer 220 generates a response to the web browser in the computing system 120, which is substantially similar to the response generated by the browser in the communication network 130. The controller 115 then monitors the behavior of the web browser in the computing system 120 and may identify an anomalous behavior in the monitored behavior. If the controller 115 identifies an anomalous behavior, the computer network 110 is deemed infected with a passive computer worm.

Figure 3:
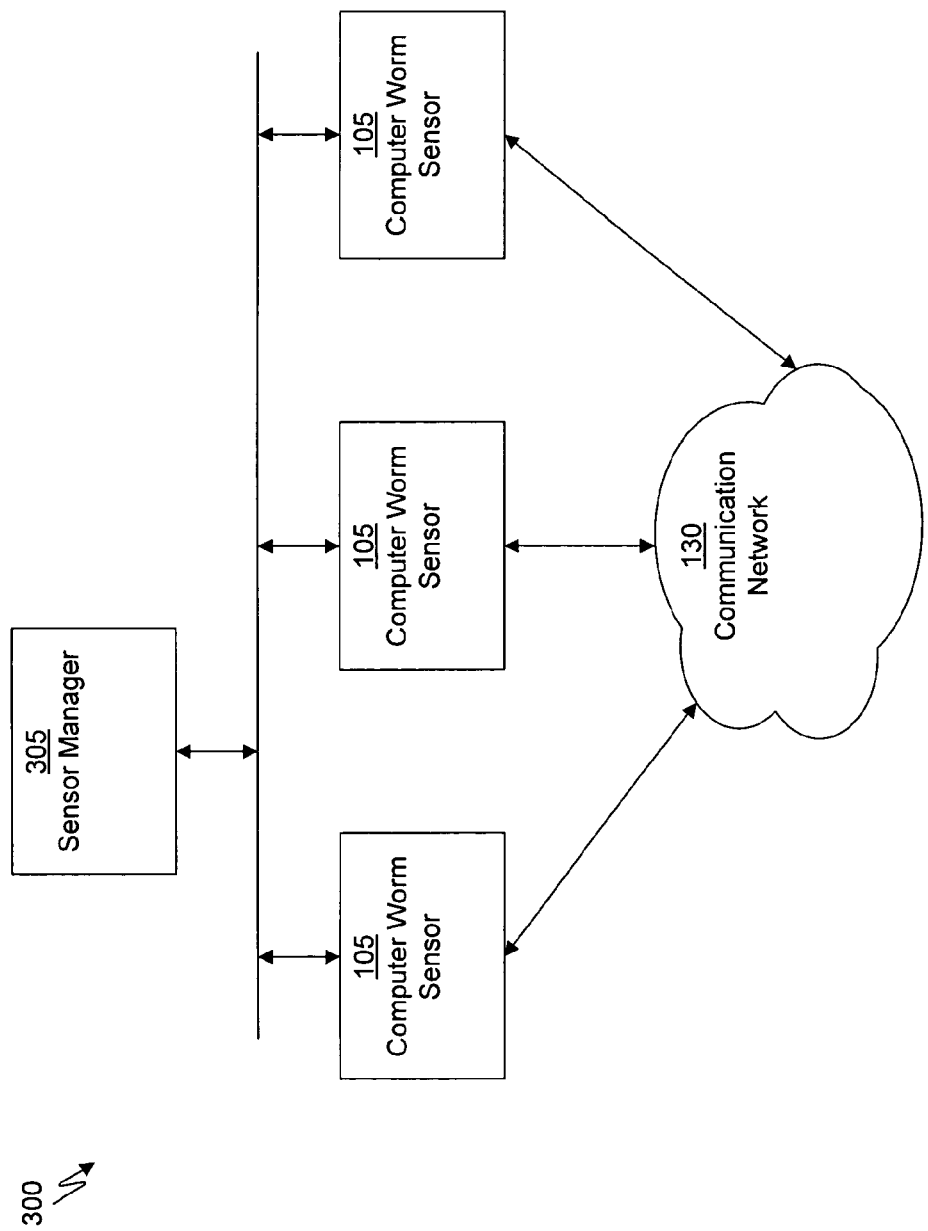
FIG. 3 depicts a computer worm detection system, in accordance with one embodiment of the present invention.

FIG. 3 depicts an exemplary computer worm detection system 300. The computer worm detection system 300 includes multiple computer worm sensors 105 and a sensor manager 305. Each of the computer worm sensors 130 is in communication with the sensor manager 305 and the communication network 130. The sensor manager 305 coordinates communications or operations between the computer worm sensors 105.

In one embodiment, each computer worm sensor 105 randomly blocks one or more ports of the computing systems 120. Accordingly, some of the worm sensors 105 may detect an anomalous behavior of a computer worm, as is described more fully herein. The worm sensors 105 that detect an anomalous behavior communicate the anomalous behavior (e.g., a signature candidate) to the sensor manager 305. In turn, the sensor manager 305 correlates the anomalous behaviors and determines an identifier (e.g., a transport vector) for detecting the computer worm.

In some cases, a human intruder (e.g., a computer hacker) may attempt to exploit vulnerabilities that a computer worm mould exploit in a computer worm sensor 105. The sensor manager 305 may distinguish an anomalous behavior of a human intruder from an anomalous behavior of a computer worm by tracking the number of computing systems 120 in the computer worm sensors 105 that detect a computer worm within a given period. If the number of computing systems 120 detecting a computer worm within the given period exceeds a predetermined threshold, the sensor manager 305 determines that a computer worm caused the anomalous behavior. Conversely, if the number of computing systems 120 detecting a computer worm within the given period is equal to or less than the predetermined threshold, the sensor manager 300 determines that a human intruder caused the anomalous behavior. In this way, false positive detections of the computer worm may be decreased.

In one embodiment, each computer worm sensor 105 maintains a list of infected hosts (e.g., computing systems infected by a computer worm) in the communication network 130 and communicates the list to the sensor manager 305. In this way, computer worm detection system 300 maintains a list of infected hosts detected by the computer worm sensors 105.

Figure 4:
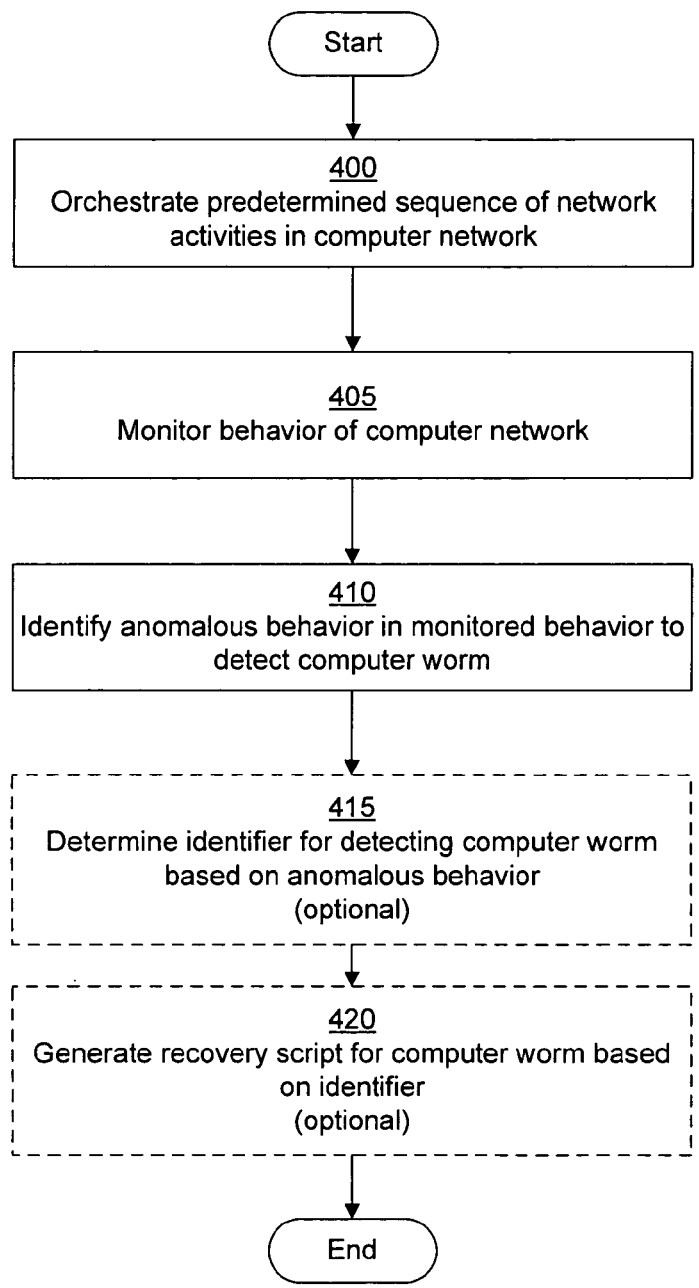
FIG. 4 depicts a flow chart for a method of detecting computer worms, in accordance with one embodiment of the present invention.

FIG. 4 depicts a flow chart for an exemplary method of detecting computer worms, in accordance with one embodiment of the present invention. In step 400, the computer worm sensor 105 (FIG. 1) orchestrates a sequence of network activities in the computer network 110 (FIG. 1). For example, the orchestration engine 205 (FIG. 2) of the computer worm sensor 105 can orchestrate the sequence of network activity in the computer network 110 based on one or more orchestration patterns, as is described more fully herein.

In step 405, the controller 115 (FIG. 1) of the computer worm sensor 105 monitors the behavior of the computer network 110 in response to the predetermined sequence of network activity. For example, the orchestration engine 205 (FIG. 2) of the computer worm sensor 105 can monitor the behavior of the computer network 110. The monitored behavior of the computer network 110 may include one or more network activities in addition to the predetermined sequence of network activities or network activities that differ from the predetermined sequence of network activities.

In step 410, the computer worm sensor 105 identifies an anomalous behavior in the monitored behavior to detect a computer worm. In one embodiment, the controller 115 identifies the anomalous behavior by comparing the predetermined sequence of network activities with network activities in the monitored behavior. For example, the orchestration engine 205 of the controller 115 can identify the anomalous behavior by comparing network activities in the monitored behavior with one or more orchestration patterns defining the predetermined sequence of network activities. The computer worm sensor 105 evaluates the anomalous behavior to determine whether the anomalous behavior is caused by a computer worm, as is described more fully herein.

In step 415, the computer worm sensor 105 determines an identifier for detecting the computer worm based on the anomalous behavior. The identifier may include a signature or a vector of the computer worm, or both. For example, the vector can be a transport vector, an attack vector, or a payload vector. In one embodiment, the extraction unit 200 of the computer worm sensor 105 determines the signature of the computer worm based on one or more signature candidates, as is described more fully herein. It is to be appreciated that step 415 is optional in accordance with various embodiments of the computer worm sensor 105.

In step 420, the computer worm sensor 105 generates a recovery script for the computer worm. An infected host (e.g., an infected computing system or network) can then execute the recovery script to disable (e.g., destroy) the computer worm in the infected host or repair damage to the host caused by the computer worm. The computer worm sensor 105 may also identify a host in the communication network 130 that is the source of the computer worm and provides the recovery script to the host such that the host can disable the computer worm and repair damage to the host caused by the computer worm.

In one embodiment, the controller 115 determines a current image of the file system in the computer network 120, and compares the current image with an original image of the file system in the computer network 120 to identify any discrepancies between the current image and the original image. The controller 115 then generates the recovery script based on these discrepancies. The recovery script includes computer program code for identifying infected software programs or memory locations based on the discrepancies, and removing the discrepancies from infected software programs or memory locations.

The embodiments discussed herein are illustrative of the present invention. As these embodiments of the present invention are described with reference to illustrations, various modifications or adaptations of the methods and/or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

The invention claimed is:

1. A system comprising:
a traffic device configured to receive network traffic over a communication network; and
a network device in communication with the traffic device, the network device comprises a controller in communication with one or more virtual machines that is configured to (i) receive the network traffic from the traffic device, (ii) monitor a behavior of a first virtual machine of the one or more virtual machines in response to processing of the network traffic within the first virtual machine, (iii) identify at least one anomalous behavior as an unexpected occurrence in the monitored behavior by accelerating activities caused by the network traffic to reduce time for detecting time-delayed malicious traffic, and (iv) determine, based on the identified anomalous behavior, the presence of the time-delayed malicious traffic in the network traffic,
wherein the controller accelerating the activities by at least intercepting one or more time-sensitive system calls and modifying one or more responses to the one or more of the system calls so as to accelerate the activities in the first virtual machine caused by the network traffic.

2. The system of claim 1, wherein the one or more time-sensitive system calls are generated by a software program in response to the network traffic, the software program being executed by the first virtual machine.

3. The system of claim 2, wherein the one or more time-sensitive system calls by the network traffic is a time-of-day system call, and the response to the time-of-day system call by the first virtual machine is to specify at least one of a future time and future date.

4. The system of claim 1, wherein the controller is further configured to (i) intercept one or more time-sensitive system calls generated by a software program in response to the network traffic, the software program being executed by the first virtual machine, and (ii) modify the intercepted one or more time-sensitive system calls so as to accelerate the activities in the first virtual machine caused by the network traffic.

5. The system of claim 4, wherein the one or more time-sensitive system calls is a sleep system call having a time parameter, which is modified so as to accelerate the activities in the first virtual machine.

6. The system of claim 1, wherein the controller is further configured to (i) identify a time consuming program loop executing in the first virtual machine, and (ii) accelerate execution of the time consuming program loop in the first virtual machine.

7. The system of claim 6, wherein the controller is configured to accelerate execution of the time consuming program loop by increasing a priority of execution of the time consuming program loop in the first virtual machine so to accelerate the activities caused by the network traffic in the first virtual machine.

8. The system of claim 1, wherein the traffic device is further configured to filter the received network traffic by passing the received network traffic to the network device that contains at least one characteristic associated with time-delayed malicious traffic.

9. The system of claim 8, wherein the traffic device is further configured to pass the received network traffic that satisfies a heuristic threshold using heuristic analysis.

10. The system of claim 1, wherein the controller is further configured as an intrusion detection system which is configured to generate an intrusion alert in response to detecting an anomalous behavior.

11. The system of claim 10, wherein the controller is further configured to generate a recovery script for the time-delayed malicious traffic to disable the malicious traffic routed over the communication network.

12. The system of claim 1, wherein the malicious traffic includes one or more computer worms.

13. The system of claim 1, wherein the traffic device is physically separate from the network device.

14. The system of claim 1, wherein the traffic device comprises a hardware device physically coupled to the communication network.

15. The system of claim 1, wherein the network device is configured to monitor the behavior of the first virtual machine by being further configured to orchestrate a plurality of network activities during processing of the received network traffic within the first virtual machine.

16. A computer implemented method comprising:
monitoring, by a network device, operatively coupled with a controller, a behavior of network traffic within a first virtual machine of one or more virtual machines, wherein the first virtual machine is configured to accelerate activities caused by the network traffic during processing thereof to reduce time for detecting time-delayed malicious traffic;
identifying at least one anomalous behavior as an unexpected occurrence in the monitored behavior; and
determining the presence of the time-delayed malicious traffic based on the anomalous behavior,
wherein accelerating of the activities by the first virtual machine includes intercepting one or more time-sensitive system calls generated by a software program in response to the network traffic, the software program being executed by the first virtual machine, and modifying the one or more responses to the one or more of the system calls so as to accelerate the activities in the first virtual machine caused by the network traffic.

17. The method of claim 16, wherein the one or more time-sensitive system calls by the network traffic is a time-of-day system call, and the response to the time-of-day system call by the first virtual machine is to specify at least one of a future time and future date.

18. The computer implemented method of claim 16, wherein prior to monitoring the behavior of the network traffic, the method further comprising:
analyzing, by a traffic device, network traffic from a communication network having one or more characteristics associated with the time-delayed malicious traffic; and
submitting, by the traffic device, the network traffic for subsequent analysis to at least the first virtual machine of the one or more virtual machines when the network traffic from the communication network is suspected of having characteristics associated with the time-delayed malicious traffic.

19. The computer implemented method of claim 18, wherein submitting select portions of the network traffic from the communication network subsequently as the network traffic when the network traffic from the communication network satisfies a heuristic threshold as determined using heuristics analysis.

20. The computer implemented method of claim 16, further comprising generating an intrusion alert in response to detecting the anomalous behavior.

21. The method of claim 20, further including generating a recovery script for the time-delayed malicious traffic to disable the malicious traffic routed over the communication network.

22. The computer implemented method of claim 16, wherein the malicious traffic includes one or more computer worms.

23. The computer implemented method of claim 16, further comprising filtering by a traffic device a portion of the network traffic having the one or more characteristics associated with malicious network traffic, the portion comprising the network traffic submitted subsequently to the first virtual machine of the one or more virtual machines.

24. The computer implemented method of claim 16, further comprising orchestrating network activities in the at least one of the plurality of virtual machines; and wherein monitoring behaviors of the at least one of the plurality of virtual machines comprises monitoring a behavior in response to the orchestrated network activities.

25. A computer implemented method comprising:
monitoring, by a network device, operatively coupled with a controller, a behavior of network traffic within a first virtual machine of one or more virtual machines, wherein the first virtual machine is configured to accelerate activities caused by the network traffic during processing thereof to reduce time for detecting time-delayed malicious traffic;
identifying at least one anomalous behavior as an unexpected occurrence in the monitored behavior; and
determining the presence of the time-delayed malicious traffic based on the anomalous behavior,
wherein accelerating of the activities by the first virtual machine includes (i) intercepting one or more time-sensitive system calls generated by a software program in response to network traffic, the software program being executed by the first virtual machine, and (ii) modifying the one or more of the system calls so to accelerate the activities in the first virtual machine caused by the network traffic.

26. The computer implemented method of claim 25, wherein the one or more time-sensitive system calls is a sleep system call, and modifying the one or more system calls comprises modifying a parameter of the sleep system call by the first virtual machine so as to accelerate the activities in the first virtual machine.

27. The computer implemented method of claim 25, wherein prior to monitoring the behavior of the network traffic, the method further comprising:

analyzing, by a traffic device, network traffic from a communication network having one or more characteristics associated with the time-delayed malicious traffic; and submitting, by the traffic device, the network traffic for subsequent analysis to at least the first virtual machine of the one or more virtual machines when the network traffic from the communication network is suspected of having characteristics associated with the time-delayed malicious traffic.

28. The computer implemented method of claim 27, wherein submitting select portions of the network traffic from the communication network subsequently as the network traffic when the network traffic from the communication network satisfies a heuristic threshold as determined using heuristics analysis.

29. The computer implemented method of claim 25, further comprising generating an intrusion alert in response to detecting the anomalous behavior.

30. The method of claim 29, further including generating a recovery script for the time-delayed malicious traffic to disable the malicious traffic routed over the communication network.

31. The computer implemented method of claim 25, wherein the malicious traffic includes one or more computer worms.

32. The computer implemented method of claim 25, further comprising filtering by a traffic device a portion of the network traffic having the one or more characteristics associated with malicious network traffic, the portion comprising the network traffic submitted subsequently to the first virtual machine of the one or more virtual machines.

33. The computer implemented method of claim 25, further comprising orchestrating network activities in the at least one of the plurality of virtual machines; and wherein monitoring behaviors of the at least one of the plurality of virtual machines comprises monitoring a behavior in response to the orchestrated network activities.

34. A computer implemented method comprising:
monitoring, by a network device, operatively coupled with a controller, a behavior of network traffic within a first virtual machine of one or more virtual machines, wherein the first virtual machine is configured to accelerate activities caused by the network traffic during processing thereof to reduce time for detecting time-delayed malicious traffic;
identifying at least one anomalous behavior as an unexpected occurrence in the monitored behavior; and
determining the presence of the time-delayed malicious traffic based on the anomalous behavior,
wherein accelerating of the activities by the first virtual machine comprises (i) identifying a time consuming program loop executing in the first virtual machine, and (ii) accelerating execution of the time consuming program loop in the first virtual machine.

35. The computer implemented method of claim 34, wherein accelerating execution of the time consuming program loop comprises increasing a priority of execution of the time consuming program loop in the first virtual machine so to accelerate the activities caused by the network traffic in the first virtual machine.

36. A computer implemented method comprising:
analyzing, by a traffic device, network traffic received over a communication network;
submitting, by the traffic device, at least select network traffic within the communication network having one or more characteristics associated with a time-delayed malicious traffic for a subsequent analysis; and performing the subsequent analysis in a network device includes, accelerating activities caused by the network traffic so as to reduce time for detecting time-delayed malicious traffic in at least one of a plurality of virtual machines, identifying one or more anomalous behaviors as an unexpected occurrence, and determining, based on the identified anomalous behavior, the presence of the time-delayed malicious traffic in the network traffic,
wherein the accelerating of the activities in the at least one of the plurality of virtual machines includes at least one of
(A) intercepting one or more time-sensitive system calls generated by a software program in response to the network traffic, the software program being executed by the at least one of the plurality of virtual machines, and either (i) modifying the one or more responses to the one or more of the system calls so as to accelerate the activities in the at least one of the plurality of virtual machines or (ii) modifying the one or more of the system calls so to accelerate the activities in the at least one of the plurality of virtual machines, and
(B) identifying a time consuming program loop executing in the at least one of the plurality of virtual machines, and (ii) accelerating execution of the time consuming program loop in the at least one of the plurality of virtual machines.

37. The computer implemented method of claim 36, wherein performing the subsequent analysis in a network device further includes: generating a recovery script for the time-delayed malicious traffic, and generating an intrusion alert in response to detecting the anomalous behavior.

38. A system comprising:
a traffic device configured to receive network traffic over a communication network; and
a network device in communication with the traffic device, the network device comprises a controller in communication with one or more virtual machines that is configured to (i) receive the network traffic from the traffic device, (ii) monitor a behavior of a first virtual machine of the one or more virtual machines in response to processing of the network traffic within the first virtual machine, (iii) identify at least one anomalous behavior as an unexpected occurrence in the monitored behavior by accelerating activities caused by the network traffic to reduce time for detecting time-delayed malicious traffic, and (iv) determine, based on the identified anomalous behavior, the presence of the time-delayed malicious traffic in the network traffic,
wherein the controller to accelerate the activities by at least intercepting one or more time-sensitive system calls and modifying the intercepted one or more time-sensitive system calls so as to accelerate the activities in the first virtual machine caused by the network traffic.

39. The system of claim 38, wherein the controller intercepting the one or more time-sensitive system calls that are generated by a software program in response to the network traffic, the software program being executed by the first virtual machine.

40. The system of claim 38, wherein the one or more time-sensitive system calls is a sleep system call having a time parameter, which is modified so as to reduce time for detecting time-delayed malicious traffic.

41. A system comprising:
a traffic device configured to receive network traffic over a communication network; and
a network device in communication with the traffic device, the network device comprises a controller in communication with one or more virtual machines that is configured to (i) receive the network traffic from the traffic device, (ii) monitor a behavior of a first virtual machine of the one or more virtual machines in response to processing of the network traffic within the first virtual machine, (iii) identify at least one anomalous behavior as an unexpected occurrence in the monitored behavior by at least (a) identifying a time consuming program loop executing in the first virtual machine, and (b) accelerating execution of the time consuming program loop in the first virtual machine in order to reduce time for detecting time-delayed malicious traffic, and (iv) determine, based on the identified anomalous behavior, the presence of the time-delayed malicious traffic in the network traffic.

42. The system of claim 41, wherein the controller is configured to accelerate execution of the time consuming program loop by increasing a priority of execution of the time consuming program loop in the first virtual machine.

\* \* \* \* \*